(12) United States Patent
Tzidon et al.

(10) Patent No.: US 11,641,041 B2
(45) Date of Patent: May 2, 2023

(54) RECHARGEABLE ZINC-AIR BATTERY WITH PERFORATED-SHELL ACTIVE PARTICLES

(71) Applicant: PHINERGY LTD, Lod (IL)

(72) Inventors: Dekel Tzidon, Hod Hasharon (IL); Joel Lang, Givatayim (IL)

(73) Assignee: PHINERGY LTD, Lod (IL)

( * ) Notice: Subject to any disclaimer, the term of this patent is extended or adjusted under 35 U.S.C. 154(b) by 114 days.

(21) Appl. No.: 16/765,294

(22) PCT Filed: Nov. 21, 2018

(86) PCT No.: PCT/IL2018/051260
§ 371 (c)(1),
(2) Date: May 19, 2020

(87) PCT Pub. No.: WO2019/102462
PCT Pub. Date: May 31, 2019

(65) Prior Publication Data
US 2020/0287203 A1    Sep. 10, 2020

Related U.S. Application Data

(60) Provisional application No. 62/589,878, filed on Nov. 22, 2017.

(51) Int. Cl.
*H01M 4/24* (2006.01)
*H01M 4/04* (2006.01)
(Continued)

(52) U.S. Cl.
CPC .......... *H01M 4/244* (2013.01); *B22F 1/0655* (2022.01); *B22F 1/16* (2022.01); *H01M 4/0416* (2013.01);
(Continued)

(58) Field of Classification Search
None
See application file for complete search history.

(56) References Cited

U.S. PATENT DOCUMENTS 8,142,938 B2    3/2012   Khasin et al.
9,941,516 B2    4/2018   Khasin et al.
(Continued)

FOREIGN PATENT DOCUMENTS

CN    103531760       1/2014
CN    106129376 A    11/2016
(Continued)

OTHER PUBLICATIONS

International Search Report dated Mar. 6, 2019 for Application No. PCT/IL2018/051260.
(Continued)

*Primary Examiner* — Brian R Ohara
*Assistant Examiner* — Patrick Marshall Greene
(74) *Attorney, Agent, or Firm* — Pearl Cohen Zedek Latzer Baratz LLP

(57) ABSTRACT

Powders, electrodes, zinc-air batteries and corresponding methods are provided. Powders comprise perforated shells having a size of at least 100 nm and comprising openings smaller than 10 nm. The shells are electrically conductive and/or comprise an electrically conductive coating. Powders further comprise zinc and/or zinc oxide which resides at least partially within the shells. Methods comprise wetting the shells with a zinc solution to yield at least partial penetration of the zinc solution through the openings, and coating zinc internally in the shells by application of electric current to the shells. Upon electrode preparation from the powder, cell construction and cell operation, zinc is oxidized to provide energy and the shells retain formed Zn O therewith, providing sufficient volume for the associated expan-
(Continued)

sion and maintaining thereby the mechanical stability and structure of the electrode—to enable many operation cycles of the rechargeable zinc-air batteries.

7 Claims, 3 Drawing Sheets

(51) Int. Cl.
*H01M 12/08* (2006.01)
*B22F 1/16* (2022.01)
*B22F 1/0655* (2022.01)

(52) U.S. Cl.
CPC ....... *H01M 4/0471* (2013.01); *H01M 12/085* (2013.01)

(56) References Cited

U.S. PATENT DOCUMENTS

| | | | |
|---|---|---|---|
| 2002/0107140 A1 | 8/2002 | Hampden-Smith et al. | |
| 2015/0017555 A1* | 1/2015 | Schuth | B01J 35/0033 429/525 |
| 2015/0287980 A1 | 10/2015 | Chen et al. | |
| 2017/0104204 A1* | 4/2017 | Zhamu | H01M 4/0416 |
| 2017/0317336 A1* | 11/2017 | Zhamu | H01M 4/133 |
| 2019/0074508 A1* | 3/2019 | Ha | H01M 4/133 |
| 2022/0247016 A1* | 8/2022 | Sata | H01M 50/193 |

FOREIGN PATENT DOCUMENTS

| | | |
|---|---|---|
| CN | 106532058 A | 3/2017 |
| CN | 107123804 A | 9/2017 |
| CN | 107369819 A | 11/2017 |
| EP | 0855752 | 7/1998 |
| EP | 2626131 | 8/2013 |

OTHER PUBLICATIONS

Zhang Zailei et al; Porus (CuO) x ZnO hollow spheres as efficient Rochow reaction catalysts; Crystengcomm; vol. 18.; No. 16; Mar. 15, 2016.
Cheng Junye et al; Catalyst-Free Synthesis of Hollow-Sphere-Like ZnO and its Photoluminescence Property; Advances in Materials Science and Engineering; vol. 2014, Jun. 23, 2014.
European Search Report dated Jul. 26, 2021 for corresponding EP Application No. EP18881738.1.
Jiang Zhaohua et al; p. 111, Haerbin Institute of Technology Press, Jan. 2017, 1st edition; non-official translation (Principles and Applications of Physical Chemistry of Solid Interfaces).
Office Action dated Mar. 2, 2022 for corresponding Chinese Application No. 2018800872389.
Office Action dated Nov. 13, 2022 for corresponding Israeli Application No. 274653.
Office Action dated Oct. 17, 2022 for corresponding Chinese Application No. 2018800872389.

\* cited by examiner

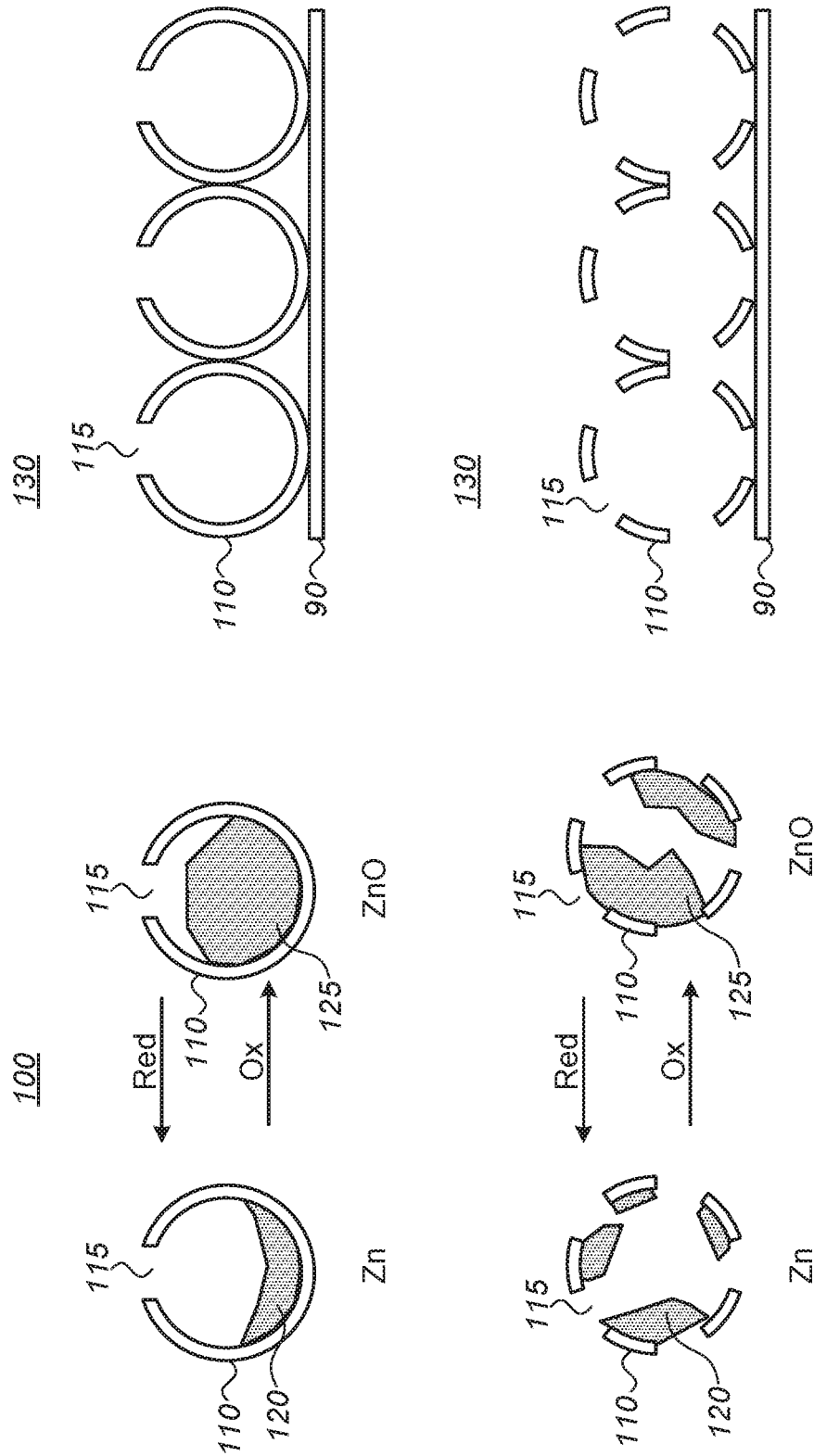

RECHARGEABLE ZINC-AIR BATTERY WITH PERFORATED-SHELL ACTIVE PARTICLES

CROSS-REFERENCE TO RELATED APPLICATIONS

This application is a National Phase Application of PCT International Application No. PCT/IL2018/051260, International Filing Date Nov. 21, 2018, entitled "Rechargeable zinc-air battery with perforated-shell active particles", published on May 31, 2019 as International Patent Application Publication No. WO 2019/102462, claiming the benefit of U.S. Provisional Patent Application No. 62/589,878, filed Nov. 22, 2017, which is incorporated herein by reference in its entirety.

BACKGROUND OF THE INVENTION

1. Technical Field

The present invention relates to the field of energy storage, and more particularly, to zinc-based batteries.

2. Discussion of Related Art

Zinc-air batteries show promising capabilities as high energy density electrochemical power sources. Zinc secondary electrodes specifically are attractive anodic candidates having a negative potential of 1.215V vs. the standard hydrogen electrode and a high theoretical capacity of 820 Ah/kg. Additionally, the advantages of the secondary zinc electrode are low toxicity, low cost, good availability of the raw material and fewer concerns regarding the disposal or recycling of the electrode.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a powder comprising: a plurality of perforated shells having a size of at least 100 nm and comprising openings smaller than 10 nm, wherein the shells are electrically conductive and/or comprise an electrically conductive coating, and zinc and/or zinc oxide which resides at least partially within the shells.

One aspect of the present invention provides a method comprising: wetting with a Zn solution a plurality of perforated shells having a size of at least 100 nm and comprising openings smaller than 10 nm, wherein the shells are electrically conductive material and/or comprise an electrically conductive coating, wherein the wetting is carried out by at least partial penetration of the Zn solution through the openings, and coating Zn at least partly internally in the shells by application of electric current to the shells.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 1 is a high-level schematic illustration of perforated shell particles in a powder, according to some embodiments of the invention FIG. 2 is a high-level schematic illustration of an electrode made of the powder, with only a first layer of perforated shell particles illustrated, according to some embodiments of the invention.

DETAILED DESCRIPTION OF THE INVENTION

Figure 4:
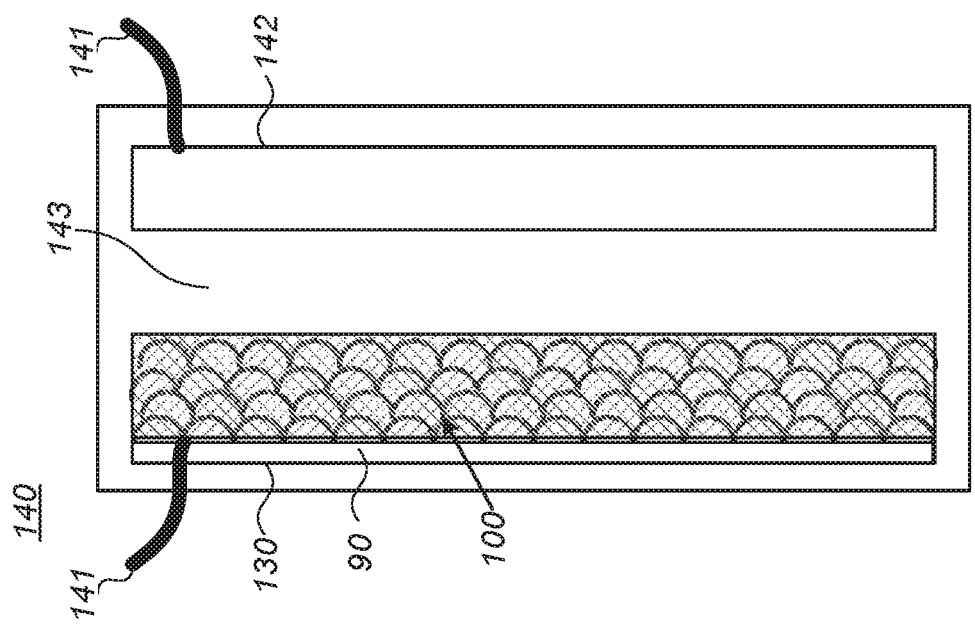
FIG. 4 is a high-level schematic illustration of a zinc-air electrochemical cell comprising the electrode, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for preparing zinc-air batteries and thereby provide improvements to the technological field of energy storage. Powders, electrodes, zinc-air batteries and corresponding methods are provided. Powders comprise perforated shells having a size of at least 100 nm and comprising openings smaller than 10 nm. The shells are electrically conductive and/or comprise an electrically conductive coating. Powders further comprise zinc and/or zinc oxide which resides at least partially within the shells. Methods comprise wetting the shells with a zinc solution to yield at least partial penetration of the zinc solution through the openings, and coating zinc internally in the shells by application of electric current to the shells. Upon electrode preparation from the powder, cell construction and cell operation, zinc is oxidized to provide energy and the shells retain formed ZnO therewith, providing sufficient volume for the associated expansion and maintaining thereby the mechanical stability and structure of the electrode—to enable many operation cycles of the rechargeable zinc-air batteries.

FIG. 1 is a high-level schematic illustration of perforated shell particles 110 in a powder 100, according to some embodiments of the invention. Powder 100 comprises a plurality of perforated shells 110 having a size of at least 100 nm and comprising openings 115 smaller than 10 nm, with shells 110 being electrically conductive (e.g., made of electrically conductive material such as Ni, Sn, C in various forms, TiN or combinations thereof) and/or comprise an electrically conductive coating 112 (e.g., a carbon-based coating in various carbon forms, e.g., graphite or graphene). Powder 100 further comprises zinc 120 and/or zinc oxide 125 which reside at least partially within shells 110. The volumes of perforated shells 110 are configured to sustain at least a 30% volume increase of Zn oxidation to ZnO.

Shells 110 may have few or many openings 115, zinc 120 may be at least partly internally coated in shells 110 after penetrating shells 110 through openings 115, e.g., in a Zn solution that is used to wet powder 100. Zinc oxide 125 may comprise zinc oxide particles 125 which are at least partly within shells 110, and may form additional particles in powder 100.

In certain embodiments, shells 110 may be formed around zinc (and/or zinc oxide) particles, e.g., by coating or by inserting the particles into a conductive matrix, as described below.

FIG. 2 is a high-level schematic illustration of an electrode made of powder 100, with only a first layer of perforated shell particles 110 illustrated, according to some embodiments of the invention.

In various embodiments, shells 110 may be at least partly agglomerated, may be pressed, and are sintered (or fused) and attached to a current collector 90 to form an electrode 130.

Figure 3:
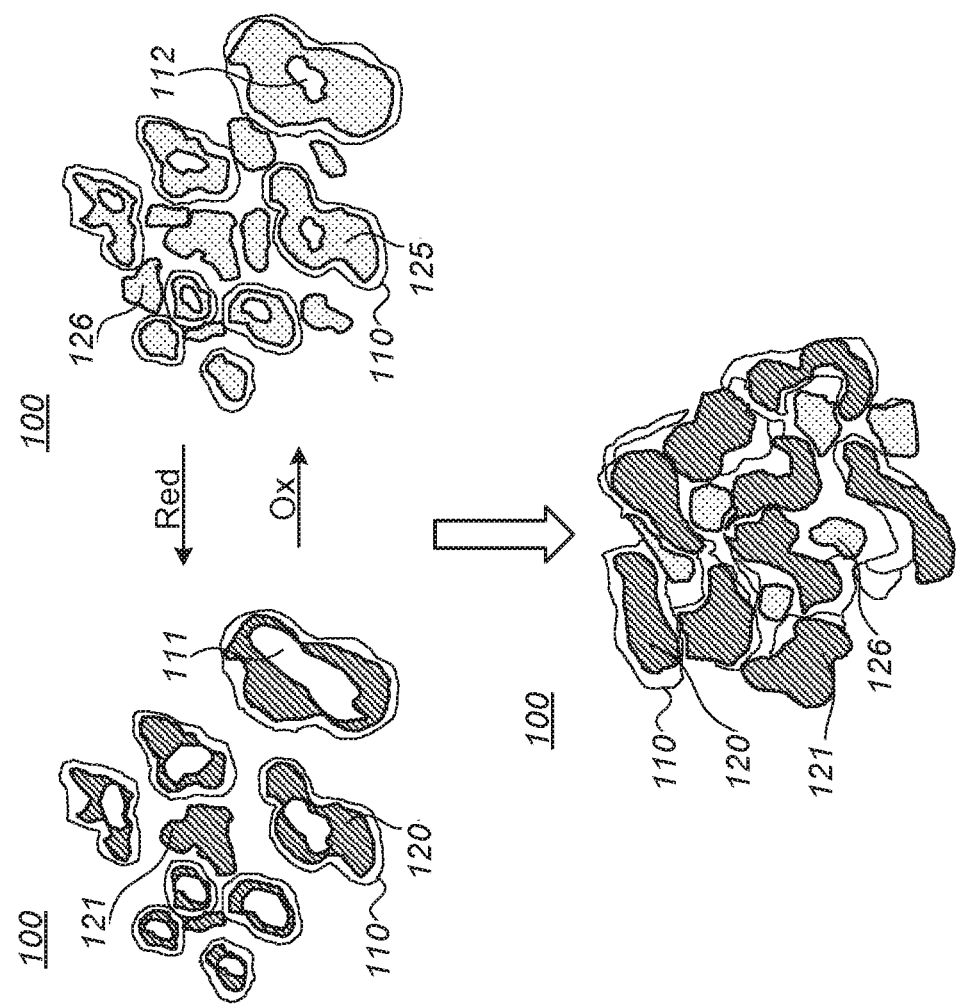
FIG. 3 is a high-level schematic illustration of powder being pressed and sintered to for the electrode active material, according to some embodiments of the invention.

FIG. 3 is a high-level schematic illustration of powder 100 being pressed and sintered to for the electrode active material, according to some embodiments of the invention. In various embodiments, shells 110 may be uniform or variable in shape and may comprise e.g., spherical, ellipsoid and/or rod-shaped shells 110, as well as partially-symmetrical shapes, non-symmetrical shapes or combinations thereof Zn and/or ZnO may be partly deposited outside of shells 110, as illustrated schematically by numerals 121 and 126, respectively. For example, some of the Zn solution may wet shells 110 externally and Zn may be coated on shells externally, and/or some ZnO particles may exit shells and/or form outside shells 110. FIG. 3 further illustrates schematically internal spaces 111 in the powder particles, which shrink 112 upon reduction of Zn to ZnO. It is noted that shells 110 are configured to be large enough, with respect to the volume of internally coated Zn, to allow for the expansion of ZnO formed by Zn oxidation. Powder 100 may be pressed and sintered in either oxidized or reduced state, or in an intermediate state (illustrated schematically with some ZnO particles remaining outside shells 110) to yield electrode 130.

FIG. 4 is a high-level schematic illustration of a zinc-air electrochemical cell 140 comprising electrode(s) 130, according to some embodiments of the invention. Zinc-air battery 140 comprising cell(s) 140 may be formed from one or more electrode 130 (made of perforated shells 110 containing Zn 120 and/or ZnO 125 and shown in a highly schematic manner with enlarged shells 110) and further comprise at least one air electrode 142 and alkaline electrolyte 143. Cathodes 142 may be air cathodes, e.g., as taught by U.S. Pat. Nos. 8,142,938 and 9,941,516, incorporated herein by reference in their entirety, comprising a catalyst attached to a PTFE (Polytetrafluoroethylene) skin on a network to which a current collector is attached. Cathodes 142 may be other types of cathodes operable in zinc-based batteries. Alkaline electrolyte 143 may comprise KOH and/or NaOH, as non-limiting examples. Contacts 141 are illustrated schematically for electrodes 130, 142.

Batteries 140 may be used as secondary, rechargeable batteries, with shells 110 supporting repeated expansion and contraction of the active material (Zn) in their internal volumes, thus protecting electrode 130 from mechanical stress and structural instability during multiple charging and discharging cycles. Perforated shells 110 are further configured to maintain at least a significant part (e.g., 50%, 70%, 90% or other values) of the active material within shells 110 during multiple charging and discharging cycles to maintain over time the structural stability of electrode 130.

In various embodiments, shells 110 may be embedded within a conductive matrix, possibly a porous conductive matrix for further mechanical stabilization and for ensuring good electrical conductivity. In certain embodiments, shells 110 may be partly or fully coated by conductive coating 112. In certain embodiments, at least some, or possibly all perforations 115 may be closed after introduction of Zn into shells 110, to prevent exit of Zn 120 and/or ZnO 125 from shells 110 upon operation. In certain embodiments, coating 112 and/or the conductive matrix may at least partly close perforations 115.

In various embodiments, shells 110 may be formed by any of electroless deposition, electrical deposition (e.g., electroplating), spraying, brushing, printing, dipping, spin-coating, vapor deposition, sputtering or combinations thereof. Shells 110 may be understood as pockets that receive and hold the active material during operation. Shells 110 may be stiff, maintaining a free space to contain ZnO particles, or shells 110 may comprise flexible pockets that can somewhat expand (e.g., within a somewhat flexible matrix) to accommodate for the increase in volume from Zn to ZnO during the discharging of the battery. Shells 110 may be configured to support mechanically small encapsulated zinc reaction zones (pockets) within electrode 130 which prevent mechanical (large scale) stresses to electrode 130 as a whole. In certain embodiments, shells 110 and/or the zinc reaction zones and/or openings 115 therein may be formed during the electrode production process, e.g., using active materials, additives, binders (e.g., polytetrafluoroethylenbe (PTFE), related PFEs, fluorinated ethylene propylene (FEP); polyvinylidene fluoride (PVDF); Poly(vinylidene fluoride-co-hexafluoropropylene) (PVDF-HFP); ethylene vinyl acetate (EVA), low density polyethylene (LDPE), polypropylene (PP), and equivalent binders), stabilizers and/or pore formers encapsulated within shells 110. Openings 115 may be configured to allow penetration of zinc solution into shells 110 and/or to maintain ionic conductivity across shell 110 to Zn/ZnO active material.

In various embodiments, coating 112 may comprise any form of carbon (e.g., graphite, graphene, nanotubes or combinations thereof), as well as any of: a metallic coating such as bismuth or indium, a metal alloy coating, a conductive polymer (possibly polymeric ink), a polymer with electronic conductive filler such as metal, carbon, graphite metal oxide, metal carbide or metal nitride or a combination of these materials. Electronic conductivity may be increased by adding a metallic mesh, expanded foil or carbon cloth within the electrode structure.

For example, as presented below, electronically conductive coating 112 may comprise a material with a high over-potential for hydrogen evolution. For example, shells 110 may comprise zinc particles having a particle size between 20-400 µm, coated with a suitable metal coating such as bismuth or tin using conventional techniques such as electrolytic bath plating, yielding a coating thickness of 0.1-5 µm. Coating 112 may be configured to be formed as a non-perfect, non-sealing coating. In another example, polymeric coating 112 (e.g., an organic electronically conductive material, e.g., graphite or graphene) may be applied onto anodic zinc particles 110. Coating 112 may be applied to particles 110 e.g., in solution, possibly using a coating precursor.

Electrode 130 may be formed by mixing shells 110 (e.g., modified and/or coated zinc particles) with other non-coated anodic particles and fusing the particles together by applying pressure to the particles or heat or a combination of both. During the heating process, pore formers may be applied or used to increase the pocket size leading to a more porous structure. Resulting zinc electrode 130 may be structured as zinc with anodic particles 110 partially coated with a conductive coating. Anodic particles 110 may be individually coated to form a sort of imperfect pocket or broken egg shell structure. Conductive coating 112 may be selected to have a low melting temperature such that the coated anodic particles may be pressed together as a cake and then sintered at a suitable temperature to form a porous three-dimensional electrode structure. Optionally, conductive particles or non-coated anodic particles or materials, e.g., calcium hydroxide, may be incorporated into this structure to reduce solubility of the zinc. In certain embodiments, during the cake formation and the sintering process, the individual additive particles may be surrounded by coated zinc, forming a complex three-dimensional structure in which the oxides or additives are in contact with metal-coated zinc particles 110.

Certain embodiments comprise the formation of anodic particles 110 within a porous structure that already contains pores or pockets (e.g., a metal foam, a metal sponge, a metal matrix, a collection of porous particles, a broken-shell structure, a skeleton, a supporting framework or a combination thereof), and serves as support for the formation of particles 110 from a particle precursor. The particle precursor may comprise zinc ions that are delivered to the porous structure within a liquid. Once inside the structure, the zinc ions may be reduced to form zinc particles. Reduction of the zinc ions may be conducted chemically or electrochemically. The formed zinc particles are protected by the porous structure.

In certain embodiments, shells 110 may be at least 100 nm in diameter and openings 115 may be smaller than 10 nm. In various embodiments, shells 110, and/or the zinc particles presented above, may range in size between 10 nm and 1000 µm, e.g., be in any of the ranges of: 100-300 nm, 300 nm-1 µm, 1-3 µm, 3-10 µm, 10-30 µm, 30-100 µmm or combinations thereof, and have various size distributions (e.g., low size distribution or possibly monodispersed, high size distribution etc.). Coating 112 may cover shells 110 to various extents, e.g., between any of 0.01-99.99%, 0.01-50%, 50-99.99% or 100% of the shell area may be coated. Coating 112 may be at least partly internal as well as external and may have a regular or an irregular coating pattern. Perforations 115 and/or perforations of coating 112 may have a regular or an irregular perforation pattern and/or shape.

In various embodiments, one or more ZnO particles 125 may be present within each shell 110, and may have small or large contact area with inner walls of shells 110, maintaining electrical contact therewith.

Figure 5:
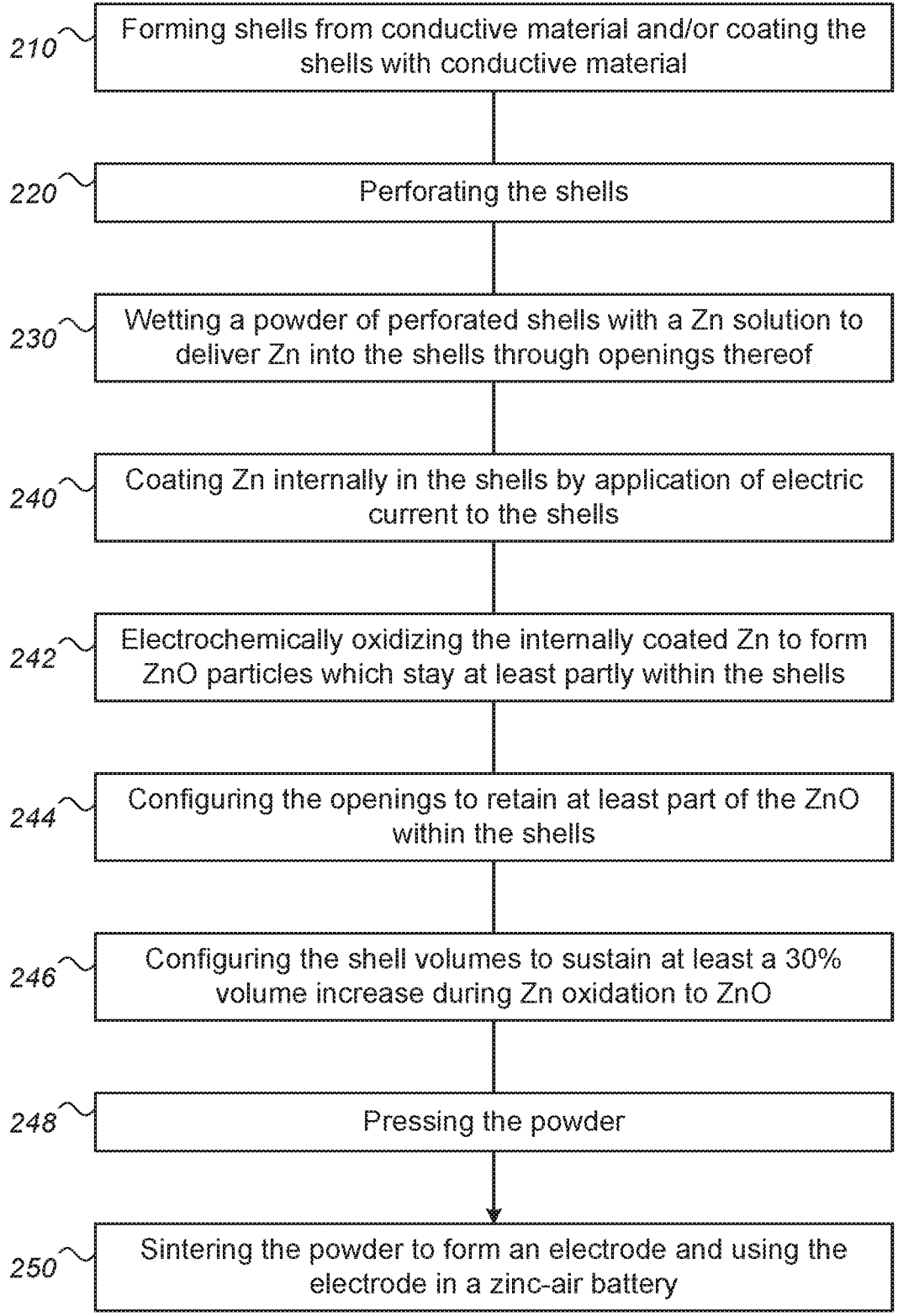
FIG. 5 is a high-level flowchart illustrating a method, according to some embodiments of the invention.

FIG. 5 is a high-level flowchart illustrating a method 200, according to some embodiments of the invention. The method stages may be carried out with respect to powders 100, electrodes 130 and cells 140 described above, which may optionally be configured to implement method 200. Method 200 may comprise the following stages, irrespective of their order.

Method 200 comprises wetting with a Zn solution a plurality of perforated shells (stage 230), the shells formed from electrically conductive material (e.g., Ni, Sn, C in various forms, TiN or combinations thereof) and/or are coated by an electrically conductive coating, e.g., a carbon-based coating. (stage 210), have a size of at least 100 nm and are perforated (stage 220) to have openings smaller than 10 nm. Wetting 230 is carried out to reach at least partial penetration of the Zn solution through the openings. Method 200 further comprises coating Zn at least partly internally in the shells by application of electric current to the shells (stage 240).

Methods 200 may optionally comprise pressing the powder (stage 248) and further comprise sintering (or fusing) the powder of the shells to form an electrode and using the electrode in a zinc-air battery (stage 250).

Method 200 may further comprise electrochemically oxidizing the internally coated Zn to form ZnO particles which are and/or stay at least partly within the shells (stage 242)—either or both in a preparatory stage (before forming the electrode in stage 250) or during operation of the battery. Complementarily, the openings may be configured to retain at least part of the ZnO within the shells (stage 244). The volumes of the perforated shells may be configured to sustain at least a 30% volume increase during Zn oxidation to ZnO (stage 246).

Advantageously, disclosed batteries 140 provide a large number of cycles, overcoming prior art limitations of zinc air batteries due to structural instability as prior art electrodes become spongy, suffer from dendrite growth and structural changes.

EXAMPLES

Example 1

Ten grams of non-coated Zinc Grillo brand battery powder is mixed with 10 grams of bismuth-coated zinc Grillo powder. The mixed powder is then placed within a 10 cm by 10 cm die and a 10 to 20 ton pressure is applied for 1 minute. The pressed electrode is then gently removed and transferred on a thin metal plate to an oven which is heated at 300° C. After 15 minutes, the plate is removed and allowed to cool to room temperature. The coated anodic particles are coated to form a sort of broken egg-shell structure (thus a non-perfect coating), and are sintered to an electrode.

Example 2

Zinc particles (Grillo brand BC 40-0/200Bi/200Ln) are coated in a tin electroplating bath to form 1-5 µm thick tin coating. 20 grams of the coated particles are added to 5 grams of zinc oxide powder. The powder is mixed in a mechanical rotating mixer for 1 hour. To this, 0.5 gram FEP powder (fluorinated ethylene propylene copolymer) produced by Dupont is added and the powder is mixed for an additional hour. The mixture is poured into a die of size 8 cm by 8 cm evenly on top of a precut silicone release paper. A tin coated mesh is placed onto the powder within the die. The head of the die is placed above the powder and a 15 ton pressure is applied for 20 seconds. The electrode cake is gently removed from the die and the silicone release paper removed. The cake is transferred to a 250° C. oven on a brass plate coated with release coating such as Teflon for a sinter period of 15 minutes. The tin as well as the FEP melts at this temperature and upon cooling becomes a handleable electrode. The electrode is released from the brass plate.

Example 3

20 grams of polymer-(Dag EB-005) coated anodic particles are added to 8 grams of non-coated zinc particles and then placed for 1 hour in a tumbler mixer to ensure homogenous mixing. The mixed powder is then placed within a 10 cm by 10 cm die and a 10 to 20 ton pressure is applied for 1 minute. The pressed electrode is then gently removed and transferred on a thin metal plate to an oven which is heated to 140° C. After 6 minutes the plate is removed and allowed to cool to room temperature. The electrode has transformed to a single block electrode which is connected via a three-dimensional conductive structure.

The polymeric coating may be an organic material with electronically conductive particles such as graphite. A commercial suitable thermoplastic polymeric material may be Dag EB-005 brand conductive coating produced by Henkel. The Dag EB-05 can be sprayed onto zinc particles such as Grillo with particle size of 100-400 microns to a form a coating with thickness of 2-3 microns. The particles may be sprayed lightly and then dried while undergoing continuous movement in a heated air bath or a vibrating plate such that the particles are in constant motion to eliminate caking of the particles. The spraying and drying process is repeated until a sufficiently thick coating is achieved. The coating is left to dry for 1 hour at room temperature.

Example 4

The anodes as described above are incorporated into a battery as follows. A flat square block of the zinc anode described in Example 1 is cut to an area size 50 mm×50 mm, with thickness of ~2 mm and is situated between two air electrodes (one on each side) at a distance of 3 mm, as described in U.S. Pat. No. 8,142,938 such that the catalyst side is facing the zinc electrode and the PTFE porous film faces the air, within a fitting block. Electrolyte (KOH concentration 350-500 gram per liter of water) flows in the gaps between the air electrode and the zinc electrode under the forced pressure of a diaphragm pump at a flow rate 0.01-0.1 L/min. The electrolyte may include efficiency-improving additives, such as stannate salt, glucose, polyacrylic acid or polyacrylates, etc. Typical working temperature lies in the range from 10 to 40° C., preferable discharge and charge current draw lies in the range of 1-30 mA/cm$^2$, at voltage 1.0-1.2 V.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A zinc-air battery comprising:
at least one electrode made of sintered powder attached to a current collector, wherein the sintered powder comprises:
a plurality of perforated shells having a size of at least 100 nm and comprising openings smaller than 10 nm, wherein the shells are stiff and made of electrically conductive Ni, Sn and/or TiN, and
zinc and/or zinc oxide which resides at least partially within the shells, wherein the zinc is oxidized during operation of the zinc-air battery, wherein the stiff perforated shells are configured to provide a free space to contain the zinc oxide and wherein the openings are configured to retain at least part of the zinc oxide within the shells,
at least one air electrode, and
alkaline electrolyte.

2. The zinc-air battery of claim 1, wherein the perforated shells are at least partly agglomerated.

3. The zinc-air battery of claim 1, wherein the zinc is at least partly internally coated in the perforated shells.

4. The zinc-air battery of claim 1, wherein the zinc oxide comprises zinc oxide particles which are at least partly within the perforated shells.

5. The zinc-air battery of claim 1, wherein volumes of the perforated shells are configured to sustain at least a 30% volume increase of Zn oxidation to ZnO.

6. The zinc-air battery of claim 1, wherein the perforated shells are coated by a carbon-based coating.

7. The zinc-air battery of claim 1, wherein the perforated shells comprise flexible pockets that expand to accommodate for an increase in volume from Zn to ZnO during oxidation.

* * * * *